UNITED STATES PATENT OFFICE 2,423,569

PROCESS FOR THE PRODUCTION OF ACYLATED HYDROXY-SUBSTITUTED CARBOXYLIC ACIDS

Herman Sokol, Hasbrouck Heights, N. J., assignor to Heyden Chemical Corporation, New York, N. Y., a corporation of Delaware No Drawing. Application March 12, 1945, Serial No. 582,408

9 Claims. (Cl. 260—479)

The present invention relates to hydroxy-substituted carboxylic acids in which the hydroxyl radical is substituted by an acyl radical and to processes for the production of such compounds. In one of its more specific aspects, the invention relates to an improved method for converting a mixed ester-anhydride of such an acid to the ester-acid, for example, acetylsalicylic-acetic anhydride to acetylsalicylic acid. In one of its preferred embodiments, the invention relates to the production of acetylsalicylic acid (aspirin) by the reaction of acetylsalicylic-acetic anhydride with acetic acid to form the desired acetylsalicylic acid and acetic anhydride.

The present application is a continuation-in-part of my prior copending application Serial No. 549,133, filed August 11, 1944, which it replaces. Attention is also directed to my application Serial No. 708,196, filed November 6, 1946, which discloses and claims subject matter originally disclosed herein.

Heretofore a wide variety of mixed anhydrides of acylated hydroxy-substituted carboxylic acids have been prepared. Such a mixed anhydride is acetylsalicylic-acetic anhydride, which can be made by reaction of salicylic acid with a large excess of acetic anhydride and by reaction with ketene. These two reactions are representable as follows:

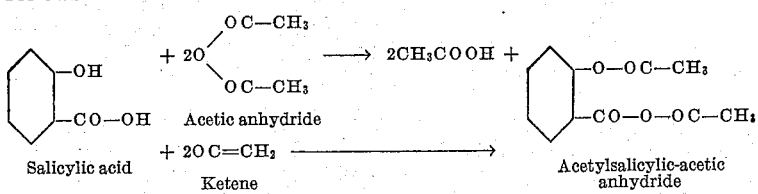

The reaction of ketene with salicylic acid to form "acetylsalicylic acid" is described in Nightingale U. S. Patent No. 1,604,472 and British Patent No. 237,574, but the patentee failed to appreciate that the resulting product contained acetylsalicylic-acetic anhydride and was not preponderantly acetylsalicylic acid (compare Van Alphen, Rec. trav. chim., 1924, vol. 43, page 823, and Rice, Greenberg, Walters and Vollrath, J. A. C. S., 1934, vol. 56, page 1764). The reactions of ketene with hydroxyacetic (glycolic), beta-hydroxypropionic (lactic), hydroxybutyric, alpha-hydroxy-isobutyric, hydroxycaproic, hydroxystearic, tartronic, tartaric, malic, citric, salicylic, hydroxytoluic, hydroxynaphthoic and gallic acids to produce the corresponding mixed ester-anhydrides are disclosed in Gaylor Patent No. 2,236,125. Rice, Greenberg, Walters and Vollrath (J. A. C. S., 1934, vol. 56, page 1764) reacted ketene with salicylic acid and obtained the expected mixed ester-anhydride, but with meta-hydroxybenzoic acid they obtained a resin. Hurd and Williams (J. A. C. S., 1936, vol. 58, pages 962 to 968) studied the reaction of ketene and alpha-hydroxy acids (specifically mandelic, benzilic and salicylic acids) and also obtained the expected corresponding mixed ester-anhydrides.

Mixed ester-anhydrides are unstable compounds, in most cases disproportionating on standing into the respective symmetrical anhydrides. For example, acetyl-salicylic-acetic anhydride disproportionates into acetylsalicylic anhydride and acetic anhydride. On heating, for example, to temperatures above approximately 100° C., the disproportionation is greatly accelerated and, when distilled at such temperatures, the distillate first appearing consists almost exclusively of the lower-boiling symmetrical anhydride which would be expected from the disproportionation reaction. Some decomposition of the ester group also occurs at higher temperatures and cannot be prevented in most cases.

Mixed ester-anhydrides also react with water and with amines. Hurd and Williams (loc. cit.), for example, obtained impure acetylsalicylic acid by adding water to a solution of acetylsalicylic-acetic anhydride in acetone. In such reaction, however, considerable hydrolysis of the acetyl radical of the acetylsalicylic acid occurs. When treated with aniline in acetone solution, acetylbenzilic-acetic anhydride yielded acetanilide and acetylbenzilic acid. In all of these reactions for converting the mixed ester-anhydride to the ester-acid, by either heating, distillation, water or aniline, considerable hydrolysis of the acyl group attached to the hydroxyl substituent of the acid invariably results. Thus, in converting acetylsalicylic-acetic anhydride to acetylsalicylic acid by means of heating, distillation, or hydrolysis by water, salicylic acid is formed in substantial quantities.

It is an object of the present invention to provide a process for the production of ester-acids conforming to the general formula:

$$Y-CO-O-R-COOH$$

in which Y is an alkyl radical and R is a hydrocarbon radical, which may be either aliphatic or aromatic, from mixed ester-anhydrides conforming to the general formula

Y—CO—O—R—CO—O—OC—Y

It is a further object of the invention to provide such a process in which there will be no substantial decomposition or hydrolysis so that some replacement of the acyl group joined to the oxygen radical of the acylated hydroxy-substituted carboxylic acid by a hydrogen radical takes place.

It is a further specific object of the present invention to provide a process for the conversion of mixtures containing acetylsalicylic-acetic anhydride, such as are obtained by reactions of salicylic acid with acetic anhydride and with ketene, to acetylsalicylic acid and acetic anhydride, without substantial decomposition or hydrolysis of the compound to form salicylic acid or other undesirable products.

Other specific objects of this invention are to provide improved processes for the production of acetyl-p-cresotinic acid (Ervasine or 3-methyl-5-acetoxybenzoic acid) and acetylglycolic (acetoxyacetic) acid, some of which are industrial products of importance or intermediates for the production of such industrial products.

Other objects and advantages of the invention, some of which are referred to specifically hereinafter, will be apparent to those skilled in the art to which the invention pertains.

In accordance with a preferred process for the practice of the invention, acetic acid, preferably glacial acetic acid, is added in excess of the stoichiometric proportion to acetylsalicylic-acetic anhydride, or another of the mixed acetic ester-anhydrides specified herein, or a reaction mixture containing such mixed ester-anhydrides, and the resulting mixture is subjected to heating at a temperature between approximately 20° C. or slightly lower and approximately 90° C. or slightly higher. In this heating, the reaction which occurs in the case of acetylsalicylic-acetic anhydride and acetic acid may be represented as:

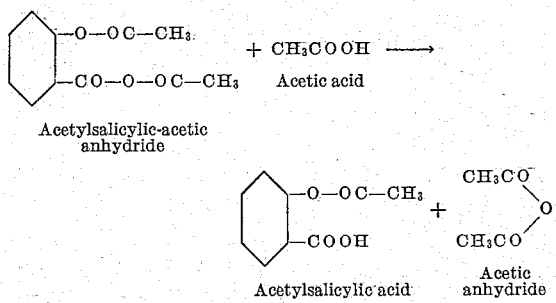

Acetylsalicylic-acetic anhydride

Acetylsalicylic acid

Acetic anhydride

After the heating the acetic anhydride which is formed is removed from the reaction mixture by distillation, preferably at subatmospheric pressure. The residue which remains may then be subjected to a second treatment with acetic acid, if the conversion of the acetylsalicylic-acetic anhydride has not proceeded to the desired extent in the first treatment. The resulting acetylsalicylic acid is then recovered and subjected to further conventional purification, if desired.

By means of the above process it is possible to avoid substantial decomposition to salicylic acid, which would result if the acetylsalicylic-acetic anhydride were decomposed by heat or by water to acetylsalicylic acid. Furthermore, the acetic anhydride represents a byproduct of considerable value. If water were used for the hydrolysis of the mixed ester-anhydride the byproduct would be the less desirable acetic acid. The process of the invention finds greater usefulness in connection with the production of acetylsalicylic acid from salicylic acid and ketene, in which process the formation of some acetylsalicylic-acetic anhydride cannot be prevented, rather than in the process of producing acetylsalicylic acid from salicylic acid and acetic anhydride, acetyl chloride or other acetylating agent, in which the acetylation can be controlled so as to yield only acetylsalicylic acid. By using the process of the invention, the excess ketene which is consumed in the production of the intermediate acetylsalicylic-acetic anhydride is recovered as acetic anhydride.

Although the foregoing description refers particularly to acetylsalicylic-acetic anhydride and similar mixed acetic ester-anhydrides and conversion of such compounds to acetic anhydride and ester-acids by means of acetic acid, the corresponding mixed anhydrides of other acids, particularly mixed anhydrides of aliphatic acids, such as those of propionic, butyric, isobutyric, pentanoic, hexanoic, dodecanoic, octadecanoic acids and the like, may be used. Such mixed ester-anhydrides may be obtained by reaction of ketene homologues such as methylketene, ethylketene, etc., or corresponding acid anhydrides or acyl chlorides, with hydroxy-substituted carboxylic acids. In the conversion of such mixed ester-anhydrides, the corresponding acid may be used instead of acetic acid to produce the corresponding anhydride as one of the reaction products. Using the generic formulae hereinabove adopted, the general reaction may be represented as:

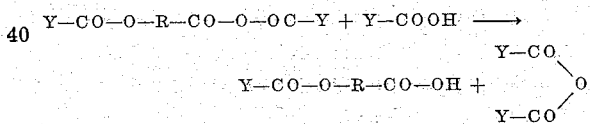

When conducting this reaction the acid which is added for the purpose of effecting the conversion is generally that which corresponds to the lowest-boiling of the two anhydrides which would be expected to form on disproportionation, since it is that anhydride which is distilled off, leaving the ester-acid as residue. These latter may be distilled or purified subsequently in other manners.

The temperatures at which the conversion of the mixed ester-anhydride in accordance with this invention are effected are generally substantially below the boiling point at atmospheric pressure of the anhydride that is formed and at or above room temperature. Thus, in the case of acetylsalicylic-acetic anhydride that is treated with acetic acid in accordance with my invention, a preferred temperature is 90° C., and a subatmospheric pressure is used thereafter so that the resulting acetic anhydride may be distilled off at approximately that temperature. The temperatures which are used are substantially below the decomposition point of the mixed ester-anhydride and thereby the danger or possibility of decomposition of the acylated hydroxy acid, which is the desired product, is greatly reduced. Furthermore, since no substantial amounts of water are used in the reaction, danger of hydrolysis of the desired products is also substantially obviated.

The process of the present invention is especially applicable to the production of acetylsalicylic acid from salicylic acid and ketene and from salicylic acid and an excess of acetic anhydride or other acetylating agent. When acetylating with ketene, in contradistinction to acetic anhydride, it is difficult to avoid the formation of substantial amounts of acetylsalicylic-acetic anhydride. The process of the invention is adapted to the treatment of mixtures consisting entirely of acetylsalicylic-acetic anhydride as well as to mixtures containing smaller proportions of said compound, such, for example, as mixtures obtained by reaction of salicylic acid with an excess of acetic anhydride that is insufficient to effect complete conversion to the mixed ester-anhydride.

In the conventional method of producing acetylsalicylic acid, the acetylation of salicylic acid is generally carried to a point short of complete acetylation of all hydroxyl radicals since further acetylation would result in the substitution of acetyl radicals into the carboxyl group with the formation of acetylsalicylic-acetic anhydride. This is undesirable because, when treated with water, the excess acetic anhydride which was used is converted to acetic acid and represents a loss of acetic anhydride in the process. As a result, in the conventional method, the yields are lower, and the concentration of acetylating agent, the reaction temperatures and periods which are used must be more carefully controlled than in the process in which acetylsalicylic acid is produced by reaction of salicylic acid with an excess of acetic anhydride or with ketene. As hereinabove stated, the reaction of ketene with salicylic acid proceeds directly to produce acetylsalicylic-acetic anhydride rather than stepwise to produce first acetylsalicylic acid and then acetylsalicylic-acetic anhydride. Furthermore, the process in which acetylsalicylic-acetic anhydride is formed requires no recovery and recycling of unreacted salicylic acid from the reaction product, which is a difficult and expensive procedure. In the production of acetylsalicylic acid by the combination of processes for the production of acetylsalicylic-acetic anhydride, either solely or only as a portion of the reaction product, together with the conversion of the acetylsalicylic-acetic anhydride to acetylsalicylic acid and acetic anhydride by reaction with substantially anhydrous acetic acid, a product of extremely high purity is obtained in substantially theoretical yields without the necessity for successive crystallization procedures and extensive procedures for the recovery of materials from mother liquors, and the excess acetylating agent which was used to make the acetylsalicylic-acetic anhydride is recovered as acetic anhydride rather than as acetic acid.

Preferred methods of practicing the general process of my invention are illustrated in the specific examples which follow:

PREPARATION A.—ACETYLSALICYLIC-ACETIC ANHYDRIDE FROM SALICYLIC ACID AND KETENE

Approximately 1 mol (138 g.) of salicylic acid was dissolved in 600 ml. of anhydrous acetone, and this solution was saturated with ketene until slightly more than 84 g. (approximately 2 mols) of ketene were absorbed. The acetone solution gave with ferric chloride solution a negative test for free salicylic acid. The acetone was removed by heating the reaction mixture on a water bath at 80° to 90° C. The residue consisted essentially of the single reaction product, acetylsalicylic-acetic anhydride, in the form of a viscous oil. In place of acetone, other inert suitable solvents, such as ether, may be used in the preparation of this compound.

Example 1.—Acetylsalicylic acid

To the mixed anhydride obtained in accordance with Preparation A was added 240 g. (approximately 4 mols) of glacial acetic acid, and the mixture was agitated at 90° C. for 2 hours. The mixture was then subjected to a reduced pressure of 20 mm. of mercury with a maximum bath temperature of 90° C. and the acetic acid and acetic anhydride were rapidly distilled from the mixture to leave a solid residue consisting of approximately 85 to 90% acetylsalicylic acid and unconverted mixed anhydride. The solid was then stirred well with 200 g. of carbon tetrachloride and filtered. The recovered solid weighed 151 g. and was shown to be pure acetylsalicylic acid according to the tests described in the U. S. Pharmacopoeia. A yield of 84% was thus obtained.

The carbon tetrachloride filtrate was heated on a water bath to evaporate the carbon tetrachloride and the residual, oily mixed anhydride was treated as described above with 40 g. of glacial acetic acid. The recovered acetylsalicylic acid from this second treatment weighed 20 g., which represents a total recovery of 171 g. of acetylsalicylic acid or an overall yield of 95%.

The distillates from the two operations contained 92 g. of acetic anhydride, which is equivalent to 90% of the theoretical amount.

The conversion of acetylsalicylic-acetic anhydride to acetylsalicylic acid and acetic anhydride is best carried out by heating approximately 4 mols of glacial acetic acid with each mol of the mixed anhydride for approximately 2 hours at a temperature of approximately 90° C. The use of less than 4 mols decreases the initial yield whereas the use of more than 4 mols does not increase the yield appreciably. The reaction may also be brought about by heating at a lower temperature for a longer period, or even at room temperature over a period of several days. The use of temperatures above approximately 90° C. may result in the formation of considerable proportions of undesirable by-products.

PREPARATION B

A mixture of 138 g. (approximately 1 mol) of salicylic acid and 204 g. (approximately 2 mols) of acetic anhydride was heated with stirring at 85°–90° C. for 3 hours and then allowed to cool overnight to room temperature. The resulting mixture gave with ferric chloride a negative test for free salicylic acid. The acetic acid and anhydride remaining was distilled from the mixture by heating in a water bath at 90° C. at a pressure of 20 mm. until no more distillate was obtained. The residue consisted of approximately 80% acetylsalicylic acid and 20% acetylsalicylic-acetic anhydride.

It is not necessary in preparing acetylsalicylic acid to use 100% acetic anhydride; 50% acetic anhydride or acetic anhydride of other concentrations may be used provided the ratio of approximately 2 mols of acetic anhydride to each mol of salicylic acid is maintained. However, the concentration used will have an effect on the content of the mixed ester-anhydride in the reaction product.

Example 2.—Acetylsalicylic acid

To the mixture obtained as described in Preparation B was added 120 g. (approximately 4 mols) of glacial acetic acid and the mixture was agitated at 80°–90° for 2 hours and then evaporated to dryness at 80° C. under a pressure of 20 mm. The solid was mixed thoroughly with 300 g. of carbon tetrachloride and filtered. After drying, the recovered acetylsalicylic acid weighed 171 g. or 95% of the theoretical amount. The product met all the specifications of the U. S. Pharmacopoeia.

The distillates from the above operations contained 93 g. of acetic anhydride, or 91% of the theoretical amount.

The carbon tetrachloride filtrate, which contains the small proportion (approximately 5% of the theoretical yield) of acetylsalicylic-acetic anhydride, may be treated a second time with acetic acid, for example, as described in Example 1.

In both of the foregoing examples, the acetylsalicylic-acetic anhydride was separated from the acetylsalicylic acid by selective solvent extraction before treatment with glacial acetic acid in accordance with the process of the invention. This however is not essential, since the mixture containing both the acid and the mixed ester-anhydride may be treated directly with glacial acetic acid.

*Example 3.—Acetylglycolic acid*

The mixed ester-anhydride, acetylglycolic-acetic anhydride, was prepared by dissolving 76 g. (approximately 1 mol) of glycolic acid in 700 ml. of anhydrous ether and saturating this solution with ketene until slightly more than 84 g. (approximately 2 mols) of ketene were absorbed. The ether was removed by evaporation on a water bath at 50°–60° C., and there remained the single reaction product, acetylglycolic-acetic anhydride, in the form of a viscous oil.

The acetylglycolic-acetic anhydride thus obtained was treated with 240 g. (approximately 4 mols) of glacial acetic acid as described in Example 1. After stripping until no more distillate was obtained, the residue was mixed with 75 g. of benzene, and the mixture was cooled to 10° C. The crystals of acetylglycolic acid were separated by filtration and, after drying, weighed 94.5 g. This represents a yield of 80% of the theoretical.

The benzene was stripped from the filtrate by evaporation on a water bath and the residual, oily, mixed anhydride was treated again with 50 g. of glacial acetic acid. The recovered acetylglycolic acid from this second treatment weighed 11.5 g.

The total recovery of acetylglycolic acid was 106 g., which is approximately 90% of the theoretical. The distillates from the above operations contained 86 g. of acetic anhydride, which is 84% of the theoretical.

Ketene ($CH_2CO$) may be considered the result of removing one molecule of water from one molecule of acetic acid, and acetic anhydride ($CH_3CO-O-OCCH_3$) may be considered as the result of removing one molecule of water from two molecules of acetic acid. Accordingly, both ketene and acetic anhydride are to be understood by the term "anhydride of acetic acid," as used in this specification.

Inasmuch as the foregoing description comprises preferred embodiments of the invention it is to be understood that the invention is not limited thereto and that conventional alterations and modifications may be made therein without departing substantially from the invention, whose scope is to be limited solely by the appended claims.

I claim:

1. A process for the production of acetylsalicylic acid which comprises the reaction of acetylsalicylic-acetic anhydride with substantially anhydrous acetic acid in such amount that at least approximately 4 molecular proportions of acetic acid are present for each molecular proportion of the acetylsalicylic-acetic anhydride, whereby acetylsalicylic acid and acetic anhydride are formed, and subsequently recovering the resulting acetylsalicylic acid.

2. A method of producing acetylsalicylic acid, which comprises reacting at a temperature of approximately 90° C. and for a period of approximately 2 hours, acetylsalicylic-acetic anhydride with substantially anhydrous acetic acid in such amount that at least approximately 4 molecular proportions of acetic acid are present for each molecular proportion of the acetylsalicylic-acetic anhydride, and subsequently recovering the resulting acetylsalicylic acid.

3. In a process for the production of acetylsalicylic acid by the reaction of salicylic acid and ketene, the improvement which comprises reacting the product of the reaction of salicylic acid and ketene with substantially anhydrous acetic acid in such amount that at least approximately 4 molecular proportions of acetic acid are present for each molecular proportion of acetylsalicylic-acetic anhydride contained in the reaction product, whereby acetylsalicylic acid and acetic anhydride are formed, and subsequently recovering the resulting acetylsalicylic acid.

4. In a process for the production of acetylsalicylic acid by the reaction of salicylic acid and acetic anhydride in which a substantial amount of acetylsalicylic-acetic anhydride is formed, the improvement which comprises subjecting the product to the action of substantially anhydrous acetic acid in such amount that at least 4 molecular proportions of acetic acid are present for each molecular proportion of acetylsalicylic-acetic anhydride contained in the product, whereby the acetylsalicylic-acetic anhydride is converted to acetylsalicylic acid and acetic anhydride, and subsequently recovering the resulting acetylsalicylic acid.

5. A method of producing acetylsalicylic acid, which comprises reacting salicylic acid with an anhydride of acetic acid to form a mixture of acetylsalicylic acid and acetylsalicylic-acetic anhydride, separating these two reaction products and reacting the acetylsalicylic-acetic anhydride with substantially anhydrous acetic acid in a ratio of approximately 1 mol of acetylsalicylic-acetic anhydride to 4 mols of acetic acid at approximately 90° C. for approximately 2 hours and subsequently recovering the resulting acetylsalicylic acid.

6. The method of producing acetylsalicylic acid, which comprises reacting salicylic acid with an anhydride of acetic acid to form a mixture of acetylsalicylic acid and acetylsalicylic-acetic anhydride, separating these two reaction products and reacting the acetylsalicylic-acetic anhydride with such an amount of substantially anhydrous acetic acid that at least approximately 4 molecular proportions of acetic acid are present for each molecular proportion of acetylsalicylic-acetic anhydride, whereby acetylsalicylic acid and acetic anhydride are formed, and subsequently recovering the resulting acetylsalicylic acid.

7. A process for the production of an O-acetyl hydroxy-substituted carboxylic acid selected from the group consisting of O-acetyl glycolic, salicylic and p-cresotinic acids, which comprises the reaction of a mixed anhydride of the O-acetyl hydroxy-substituted carboxylic acid and acetic acid with such an amount of substantially anhydrous acetic acid that at least approximately 4 molecular proportions of acetic acid are present for each molecular proportion of the mixed anhydride, whereby the O-acetyl hydroxy-substituted carboxylic acid and acetic anhydride are formed, and subsequently recovering the resulting O-acetyl hydroxy-substituted carboxylic acid.

8. A process for the production of an O-acylated hydroxy-substituted carboxylic acid in which the acyl group is that of a lower aliphatic carboxylic acid and the hydroxy-substituted carboxylic acid is selected from the group consisting of glycolic, salicylic and p-cresotinic acids, which comprises the reaction of a mixed anhydride of the O-acylated hydroxy-substituted carboxylic acid and the acid corresponding to the acyl radical of the O-acylated hydroxy-substituted carboxylic acid with such an amount of substantially anhydrous acid corresponding to the acyl radical of the O-acylated hydroxy-substituted carboxylic acid that at least approximately 4 molecular proportions of the acid are present for each molecular proportion of the mixed anhydride, whereby the O-acylated hydroxy-substituted carboxylic acid and the anhydride of the acid corresponding to the acyl radical of the O-acylated hydroxy-substituted carboxylic acid are formed, and subsequently recovering the resulting O-acylated hydroxy-substituted carboxylic acid.

9. A process for the production of acetylglycolic acid which comprises the reaction of acetylglycolic-acetic anhydride with substantially anhydrous acetic acid in such amount that at least approximately 4 molecular proportions of acetic acid are present for each molecular proportion of the mixed anhydride, whereby acetylglycolic acid and acetic anhydride are formed, and subsequently recovering the resulting acetylglycolic acid.

HERMAN SOKOL.

REFERENCES CITED

The following references are of record in the file of this patent:

UNITED STATES PATENTS

| Number | Name | Date |
|---|---|---|
| 1,863,788 | Hale | June 21, 1932 |
| 1,604,472 | Nightingale | Oct. 26, 1926 |
| 2,017,182 | Malm et al. | Oct. 15, 1935 |
| 2,099,909 | Steik et al. | Nov. 23, 1937 |
| 2,236,125 | Gaylor | Mar. 25, 1941 |
| 1,648,540 | Clarke et al. | Nov. 8, 1927 |

OTHER REFERENCES

Rice et al., "Jour. Am. Chem. Soc.," vol. 56 (1934), pp. 1760–65.